United States Patent Office 2,772,143
Patented Nov. 27, 1956

2,772,143
METHOD OF RECOVERING MAGNESIUM SALTS FROM SEA WATER

William F. McIlhenny and Albert B. Baker, Freeport, and James A. Clarke, Lake Jackson, Tex., assignors to The Dow Chemical Company, Midland, Mich., a corporation of Delaware No Drawing. Application September 30, 1953, Serial No. 383,392

4 Claims. (Cl. 23—91)

This invention concerns certain improvements in the recovery of magnesium and its salts from sea water or similar brines by use of ion exchange agents. It relates more particularly to a procedure for removing the calcium solute from sea water prior to recovery of the magnesium by absorption on an ion exchange resin.

Grebe et al. in United States Patent No. 2,387,898, describe a method for producing magnesium salts in a more concentrated form from sea water, wherein the sea water is contacted with a cation exchange resin which absorbs the magnesium ions from the water, after which the absorbed magnesium ions are displaced from the resin by washing the latter with a concentrated aqueous solution of sodium chloride to obtain a magnesium chloride solution containing the magnesium in higher concentration than in the sea water. The operations of absorbing the magnesium ions from the sea water by the cation exchange resin and displacement of the absorbed magnesium ions from the resin by washing the latter with a concentrated aqueous salt solution may be repeated for any number of times.

It has been observed in recovering magnesium and its salts from sea water, or a similar brine containing the same and a dissolved calcium salt, e. g. calcium chloride, and sodium ions by absorption of the magnesium ions on a cation exchange resin, that the proportion of magnesium ions absorbed by the resin varies considerably with change in the amount of the calcium solute in the water and also with change in the relative proportions of sodium and magnesium ions in the water.

It has now been found that by removing a predominant amount of the calcium solute from sea water, or a similar brine containing magnesium, calcium and sodium ions, and thereafter contacting the pre-treated liquor with a cation exchange resin, that the proportion of magnesium ions absorbed by the resin is substantially greater than is obtained by contact of the raw water or brine with the resin under otherwise similar conditions.

It has further been discovered that by subjecting sea water, or a similar brine containing a dissolved calcium salt, together with magnesium and sodium ions, to a pre-treatment with an alkali carbonate, e. g. sodium carbonate, ammonium carbonate, or potassium carbonate under alkaline conditions corresponding to a pH value for the liquid of from 8.5 to 9.5, or to pre-treatment with both an alkali carbonate and an alkali such as ammonia, ammonium hydroxide, potassium hydroxide, or sodium hydroxide, under similar alkaline conditions as hereinafter described, that a predominant amount of the dissolved calcium can readily be caused to precipitate while the principal proportion of the magnsium solute remains in solution. The precipitate of calcium compounds is separated from the aqueous liquor in usual ways, e. g. by filtering or by settling, after which the clarified liquor is contacted with a cation exchange resin in a form suitable for absorbing and removing the magnesium ions from the aqueous liquid.

It is important in pre-treating the sea water, or a similar brine, that the water be treated with the alkali carbonate, e. g. sodium carbonate, potassium carbonate or ammonium carbonate, etc., in amount chemically equivalent to at least 75, preferably from 75 to 85, percent of the dissolved calcium salts, together with another alkali in amount sufficient to bring the aqueous liquor to a pH value between 8.5 and 9.5, in order to cause the precipitation of a predominant amount of the calcium solute while retaining the principal proportion of the magnesium salts in solution. An alkalinity of the sea water greater than that corresponding to a pH value of 9.5 usually results in precipitation of a large proportion of the magnesium solute. The alkalinity of the water may be adjusted by the addition of alkali carbonate thereto in amount sufficient to react with the calcium solute and bring the pH value of the aqueous liquor within the range of from 8.5 to 9.5, but such procedure is less satisfactory than employing the combination of both an alkali carbonate, e. g. sodium carbonate, in amount chemically equivalent to from 75 to 85 percent of the calcium solute and an alkali such as ammonia, ammonium hydroxide, potassium hydroxide, or sodium hydroxide, preferably the latter, in amount sufficient to bring the alkalinity of the aqueous liquor to a pH value between 8.5 and 9.5. The latter method usually results in the precipitation of approximately 80 percent by weight of the calcium solute, while 85 percent, or more, of the magnesium salts remain in solution. After separating the precipitate in usual ways, e. g. by filtering or settling, the aqueous liquor containing the principal proportion of the magnesium salts as solute is passed into contact with a cation exchange resin in a form suitable for absorbing the magnesium ions from the solution.

Any cation exchange resin may be employed in the process for absorbing the magnesium ions from the treated liquor. Examples of suitable cation exchange resins are sulfonated phenol-formaldehyde resins, or sulfonated copolymers of monovinyl aromatic hydrocarbons and polyvinyl aromatic hydrocarbons. A number of such cation exchange resins are known and are available to the trade as "Amberlite IR-120," "Dowex 50," "Nalcite HCR," or "Chempro C-20." To be best suited for the purpose, the cation exchange resin should have a high absorptive capacity for magnesium ions and should be one from which the absorbed magnesium ions can rapidly and economically be displaced, e. g. by alkali metal or hydrogen ions. The sulfonated vinyl aromatic resins are preferred. The cation exchange resin may be used in the hydrogen form, or the salt form. The latter form is preferred, suitably the sodium form of a cation exchange resin containing sulfonic acid groups.

Absorption of the magnesium ions by the cation exchange resin may be carried out in usual ways, e. g. by passing the pre-treated sea water, or a similar brine, through one or a plurality of beds of the cation exchange resin. Alternatively, absorption of magnesium ions from the pre-treated liquor may be carried out by passing the liquor into contact with a moving bed or body of the granular cation exchange resin. Such methods for the removal of cations from aqueous liquids are well known and need not be discussed in detail. The absorbed magnesium ions are displaced from the cation exchange resin by washing the resin with a concentrated aqueous salt solution, preferably an aqueous solution containing at least 10 percent by weight of sodium chloride, to obtain an aqueous magnesium chloride solution containing the magnesium in higher concentration than in the sea water. After displacement of the absorbed magnesium ions from the resin with an aqueous solution of sodium chloride, the cation exchange resin is in a form suitable for reemployment in the process.

In carrying out the process for the recovery of magnesium salts from sea water, the raw sea water, after filtering to remove insoluble substances, is usually diluted with fresh water. The dilution may be to about 50 percent salinity, in which case the sea water is diluted with approximately an equal volume of fresh water. The aqueous liquid is mixed with sodium carbonate in amount chemically equivalent to at least 75, preferably from 75 to 85 percent of the calcium solute. An alkali such as ammonia, ammonium hydroxide, potassium hydroxide, or sodium hydroxide, in amount sufficient to bring the liquor to a pH value within the range of from 8.5 to 9.5 is usually added. The resulting mixture is usually agitated and maintained at a temperature of from 10° to 80° C. for a time of from 0.25 to 8 hours, or longer, with resultant formation and precipitation of a predominant amount of the calcium solute as calcium carbonate while the principal proportion of the magnesium salts remain dissolved in the aqueous liquid. The precipitate is separated from the liquor in usual ways, e. g. by filtering or by settling and decanting of the aqueous liquor. The clarified aqueous liquor containing the dissolved magnesium salts is passed into contact with a cation exchange resin, suitably the sodium form of a sulfonated vinyl aromatic resin such as "Dowex-50," whereby magnesium ions are absorbed by the resin and are removed from the solution. The resin is separated from the liquor. Thereafter, the cation exchange resin containing the absorbed magnesium ions is contacted with a concentrated aqueous solution of an alkali metal salt, e. g. a sodium chloride solution of at least 10 percent by weight concentration, to displace the absorbed magnesium ions from the cation exchange resin with resultant formation of a magnesium salt solution containing the magnesium in higher concentration than in the sea water.

The following examples illustrate ways in which the principle of the invention has been applied, but are not to be construed as limiting its scope.

*Example 1*

A charge of 500 gallons of a batch of 50 percent salinity sea water, i. e. sea water diluted with an equal volume of fresh water, having a pH value of 7.6 and containing magnesium, calcium and sodium salts in amounts corresponding to the analysis:

|     | Parts per million |
| --- | --- |
| Mg  | 578 |
| Ca  | 198 |
| Na  | 4800 |
| Cl  | 8950 |
| $CO_3$ | 6 |
| $HCO_3$ | 97 | wherein each solute is stated in parts by weight per million parts of the water, was placed in a cone-bottomed vessel equipped with a stirrer and pump with suitable conduits for withdrawing liquid from the bottom of the vessel and pumping it into the top of the vessel. The water was stirred and was continuously recirculated by means of the pump and conduits, while adding 1.82 pounds of sodium carbonate and 161 cc. of an aqueous 50 percent by weight solution of sodium hydroxide, to the water. After addition of said alkaline agents, the aqueous liquid had an alkalinity corresponding to a pH value of 9.2. The liquid mixture was seeded with a small amount of powdered calcium carbonate. A heavy precipitate of magnesium hydroxide was immediately formed, which precipitate dissolved upon continued agitation with formation of an insoluble precipitate composed predominantly of calcium carbonate. After seeding the solution with the small amount of the powdered calcium carbonate, the solution was agitated for approximately 4 hours, then allowed to settle for 16 hours. The mixture separated into an upper clarified liquid layer and a lower sludge layer containing the precipitate.

The clarified liquid was separated from the sludge layer and was analyzed. The liquid was found to have a salinity of 48.7 percent and to contain magnesium, calcium and sodium salts in amounts corresponding to the analysis:

|     | Parts per million |
| --- | --- |
| Mg  | 553 |
| Ca  | 40 |
| Na  | 4870 |
| Cl  | 9030 |

The dissolved calcium salts in the initial 50 percent salinity sea water were reduced by 93 percent, with lowering of the magnesium solute by only 3.5 percent. The treated water contained 96.5 percent by weight of the magnesium salts in the initial solute.

*Example 2*

A four inch internal diameter glass tube was filled with Dowex-50 cation exchange resin in the sodium form to form a bed of the resin 128 inches deep. The cation exchange resin was a sulfonated copolymer of approximately 88 percent by weight styrene, 4 percent ar-ethylvinyl-benzene and 8 percent divinylbenzene and was in the form of rounded granules of sizes from 20 to 50 mesh per inch as determined by U. S. Standard screens. The resin had a cation exchange capacity of 0.13 pound equivalent of magnesium per cubic foot of a bed of the wet resin. The bed of the cation exchange resin had a total capacity corresponding to 1.47 pounds of magnesium. A portion of the batch of the pre-treated sea water of 48.7 percent salinity, having the analysis:

|     | Parts per million |
| --- | --- |
| Mg  | 553 |
| Ca  | 40 |
| Na  | 4870 |
| Cl  | 9030 | and a pH value of 9.2, obtained in Example 1, was fed to the column at a rate of approximately 20 gallons of the water per hour. The sea water was fed to the column and passed upflow through the bed of the cation exchange resin over a period of 12 hours. A total of 258 gallons of the sea water was fed to the bed of the resin. After feed of the 258 gallons of the pre-treated sea water to the bed of the resin, a saturated aqueous solution of sodium chloride was fed to the column at a rate of approximately 12.5 gallons of the salt solution per hour and was passed upflow through the bed of the resin to displace the absorbed magnesium ions from the resin. The effluent liquor was collected as successive fractions and the fractions analyzed for magnesium chloride. Table I identifies the fractions as being stated portions of the effluent liquor and gives the percent by weight of magnesium chloride in each fraction.

TABLE I

| Fraction No. | Volume Liters | Percent $MgCl_2$ |
| --- | --- | --- |
| 1 | 0–12 | 0.4 |
| 2 | 12–13 | 0.8 |
| 3 | 13–14 | 1.4 |
| 4 | 14–15 | 2.5 |
| 5 | 15–16 | 3.9 |
| 6 | 16–17 | 5.6 |
| 7 | 17–18 | 7.3 |
| 8 | 18–19 | 8.5 |
| 9 | 19–20 | 9.9 |
| 10 | 20–21 | 10.2 |
| 11 | 21–22 | 10.0 |
| 12 | 22–23 | 9.2 |
| 13 | 23–24 | 7.8 |
| 14 | 24–25 | 6.3 |
| 15 | 25–26 | 4.9 |
| 16 | 26–27 | 3.6 |
| 17 | 27–28 | 2.6 |
| 18 | 28–29 | 1.9 |
| 19 | 29–30 | 1.5 |

Fractions Nos. 6–14 were combined to form 9 liters of an aqueous solution containing 8.3 per cent by weight of magnesium chloride. This corresponds to 203 grams of magnesium.

In contrast, when a portion of the batch of the untreated 50 percent salinity sea water described in Example 1, was fed to the bed of the cation exchange resin in the sodium form and magnesium ions absorbed from the water by the resin and the absorbed magnesium eluted from the resin by washing the latter with a concentrated aqueous salt solution under similar operating conditions, there was obtained as a mid-portion of the effluent liquor only 8 liters of solution containing upwards of from 5.7 per cent by weight magnesium chloride, or an average concentration of 7.1 percent magnesium chloride for the 8 liters of solution. This corresponds to only 154 grams of magnesium.

*Example 3*

A charge of 750 cc. of 88 percent salinity sea water containing calcium and magnesium salts in amounts corresponding to the analysis:

| | Parts per million |
|---|---|
| Mg | 1,135 |
| Ca | 395 |
| Cl | 16,650 | and having a pH value of 8.25, was mixed with 118.5 cc. of an aqueous 0.1-normal solution of sodium carbonate and 2.6 cc. of an aqueous 1-normal sodium hydroxide solution. The mixture was agitated and allowed to stand for a period of 47 hours, to separate the precipitate. A portion of the clarified liquor was separated and analyzed. It was found to have a salinity of 75.6 percent and an alkalinity corresponding to a pH value of 9.35. The solution contained calcium and magnesium salts in amounts corresponding to the analysis:

| | Parts per million |
|---|---|
| Mg | 990 |
| Ca | 58 |
| Cl | 12,400 |

*Example 4*

In each of a series of experiments a charge of 750 cc. of 53 percent salinity sea water was mixed with 66 cc. of an aqueous 0.1-normal sodium carbonate solution and 1.5 cc. of a 1-normal aqueous solution of an alkali as stated in the following table. The mixture was agitated by shaking, then allowed to stand for a period of 42 hours. A portion of the clarified liquid was withdrawn and was analyzed. Table II identifies each experiment by stating the kind and amount of the alkali added to the 750 cc. charge of the initial 53 percent salinity sea water. The table gives the alkalinity of the treated water expressed as its pH value and the amount of magnesium, calcium and chloride, expressed as parts by weight of the same per million parts of the water. The table also gives the percent salinity of the water.

TABLE II

| Run No. | 1-Normal Alkali Solution | | Treated Solution | | | | |
|---|---|---|---|---|---|---|---|
| | Kind | cc. | pH | Mg, ppm. | Ca, ppm. | Cl, ppm. | Percent Salinity |
| 1 | None | 0 | 7.6 | 670 | 214 | 10,050 | 53 |
| 2 | NaOH | 1.5 | 9.50 | 598 | 39 | 9,000 | 48 |
| 3 | KOH | 1.5 | 9.45 | 603 | 43 | 8,570 | 45 |
| 4 | NH₄OH | 1.5 | 8.70 | 616 | 63 | 8,700 | 46 |

*Example 5*

Sea water of 50 percent salinity, i. e. sea water diluted with an equal volume of fresh water, and containing calcium and magnesium salts as solute in amounts corresponding to 610 parts by weight of magnesium and 200 parts of calcium per million parts by weight of the water, was fed to a 1500 gallon cone-bottomed vessel at a rate of 60 gallons of the water per hour. Simultaneously with feed of the sea water there was fed to the vessel an aqueous solution (prepared by dissolving 1250 grams of sodium carbonate and 200 cc. of an aqueous 50 weight percent solution of sodium hydroxide in 50 gallons of water) at a rate of approximately 5.1 gallons of the solution per hour. The mixture was continuously withdrawn from the bottom of the vessel and passed by means of a pump and suitable conduit to a settling tank above the treating vessel, wherein the precipitate was allowed to settle as a sludge while the overflow of clarified water was recycled to the treating vessel. After the vessel was substantially filled with liquor, the clarified liquid was continuously withdrawn from the treating vessel at a rate corresponding approximately to the feed of material thereto. The treated water had a salinity of 43 percent and an alkalinity corresponding to a pH value of 8.88. The water contained calcium and magnesium salts as solute in amounts corresponding to 50 parts by weight of the calcium and 530 parts of the magnesium per million parts of the water. The treated water was continuously passed into contact with a moving bed of a cation exchange resin in the sodium form similar to that described in Example 2, to absorb magnesium ions from the solution. The resin was separated from the liquid, after which the absorbed magnesium ions were displaced from the resin by contacting the latter with a nearly saturated aqueous solution of sodium chloride with resultant formation of a concentrated aqueous solution of magnesium chloride and regeneration of the resin to the sodium form. The magnesium chloride solution was separated from the resin and was analyzed. The aqueous solution had a density of 1.170 at 25° C. and contained 11.75 percent by weight of magnesium chloride, 0.58 percent of calcium chloride and 11.20 percent of sodium chloride. After operating the process continuously for three days, the aqueous product solution then being withdrawn from the resin was found to have a density of 1.169 at 25° C. and to contain 11.80 percent by weight of magnesium chloride, 0.45 percent of calcium chloride and 8.25 percent of sodium chloride.

In contrast, when the untreated solution of 50 percent salinity sea water was fed into contact with the sodium form of the cation exchange resin to absorb magnesium ions from the raw 50 percent salinity sea water and the absorbed magnesium ions were displaced from the resin with a nearly saturated aqueous sodium chloride solution under similar operating conditions, the aqueous product solution which was separated from the resin was found to contain only 9 percent by weight of magnesium chloride.

We claim:

1. In a process for producing a magnesium salt from sea water, wherein the sea water is brought into contact with a cation exchange resin whereby magnesium ions are absorbed on the resin and are removed from the solution and the absorbed magnesium ions are eluted from the resin by contacting the resin with a stream of an aqueous alkali metal salt solution, containing the alkali metal salt in amount corresponding to at least 10 percent by weight of the solution, with formation of a magnesium salt solution containing the magnesium in higher concentration than in the sea water, the steps which consist in pre-treating the sea water by adding sodium carbonate thereto in amount chemically equivalent to from 75 to 85 percent by weight of the dissolved calcium and an alkali selected from the group consisting of ammonia, ammonium hydroxide, potassium hydroxide and sodium hydroxide, in amount sufficient to bring the aqueous liquid to a pH value between 8.5 and 9.5, with resultant formation of an insoluble precipitate of a predominant amount of the calcium solute while the principal proportion of the magnesium salt remains in solution, separating the precipitate from the liquid, then passing the clarified aqueous liquor into contact with a cation exchange resin in a form suitable for absorbing magnesium ions from the aqueous solution.

2. A process as described in claim 1, wherein the sea water is pre-treated at a temperature of from 10° to 80° C.

3. In a process for producing a magnesium salt solution from sea water, wherein the sea water is brought into contact with a cation exchange resin whereby magnesium ions are absorbed on the resin and are thereafter eluted from the resin with formation of a magnesium salt solution containing the magnesium in higher concentration than in the sea water, the steps which consist in first adding sodium carbonate to the sea water in amount chemically equivalent to from 75 to 85 percent of the dissolved calcium, and sodium hydroxide in amount sufficient to bring the aqueous solution to a pH value between 8.5 and 9.5, with resultant formation of an insoluble precipitate of a predominant amount of the calcium solute while the principal proportion of the magnesium salt remains in solution, separating the precipitate from the thus-treated sea water, then passing the aqueous solution containing the magnesium solute into contact with a cation exchange resin in the sodium form, whereby magnesium ions are absorbed on the resin and are removed from the solution and thereafter treating the resin with a stream of an aqueous sodium chloride solution of at least 10 percent concentration, whereby the absorbed magnesium ions are displaced from the cation exchange resin with formation of a magnesium chloride solution containing the magnesium in higher concentration than in the sea water.

4. A process as described in claim 3, wherein the cation exchange resin is a sulfonated insoluble cross-liked vinyl aromatic resin.

References Cited in the file of this patent

UNITED STATES PATENTS

| 2,387,898 | Grebe et al. | Oct. 30, 1945 |

FOREIGN PATENTS

| 536,266 | Great Britain | May 8, 1941 |
| 541,450 | Great Britain | Nov. 27, 1941 |
| 543,665 | Great Britain | Mar. 6, 1942 |

OTHER REFERENCES

"Ion Exchange Resins," by Kunin and Myers, 1950 ed., page 25, John Wiley and Sons, Inc., N. Y.